US00RE49889E

(19) United States
(12) Reissued Patent
Pedersen

(10) Patent Number: US RE49,889 E
(45) Date of Reissued Patent: Mar. 26, 2024

(54) SYSTEMS AND METHODS FOR GENERATING AND/OR MODIFYING ELECTRONIC SHOPPING LISTS FROM DIGITAL ADVERTISEMENTS

(71) Applicant: AdAdapted, Inc., Ann Arbor, MI (US)

(72) Inventor: Michael Pedersen, Ann Arbor, MI (US)

(73) Assignee: AdAdapted, Inc., Ann Arbor, MI (US)

(21) Appl. No.: 17/133,463

(22) Filed: Dec. 23, 2020

Related U.S. Patent Documents

Reissue of:
(64) Patent No.: 10,692,129
Issued: Jun. 23, 2020
Appl. No.: 16/107,798
Filed: Aug. 21, 2018

U.S. Applications:
(60) Provisional application No. 62/548,336, filed on Aug. 21, 2017.

(51) Int. Cl.
*G06Q 30/00* (2023.01)
*G06Q 30/02* (2023.01)
(Continued)

(52) U.S. Cl.
CPC ..... *G06Q 30/0633* (2013.01); *G06Q 30/0267* (2013.01); *G06Q 30/0277* (2013.01)

(58) Field of Classification Search
CPC ..... G06Q 30/0267; G06Q 30/0277; G06Q 30/0633
See application file for complete search history.

(56) References Cited

U.S. PATENT DOCUMENTS 7,334,728 B2 * 2/2008 Williams ..... G06Q 30/0207 235/383
7,756,757 B1 * 7/2010 Oakes, III ..... G06Q 30/02 705/26.1

(Continued)

FOREIGN PATENT DOCUMENTS

JP 2002304671 A * 10/2002 ..... G07G 1/00
JP 2003346035 A * 12/2003 ..... G06F 17/60
JP 2009245425 A * 10/2009 ..... G06Q 30/00

OTHER PUBLICATIONS

Whisk.com. Whisk's Grocery Shopping List Technology Delivers Increased Visibility to Food Brands in . . . (Jan. 15, 2013). Retrieved online Feb. 29, 2020. https://whisk.com/press/shopping-list-startup-whisk-com-eyes-global-fmcg-marke (Year: 2013).*

(Continued)

*Primary Examiner* — Joshua D Campbell
(74) *Attorney, Agent, or Firm* — Perkins Coie LLP; Michael A. Glenn

(57) ABSTRACT

Systems and methods are provided for generating and/or modifying a shopping list from a mobile advertisement. The advertisement can be targeted from a predefined algorithm, from multiple algorithms, or generated in real time based on items presented to a user. The advertisement may be random. When the advertisement is selected for viewing, it provides the option for saving information about the advertised product to a shopping list. The list may be a remote list that may be accessed via a deep link URL, a cloud-based storage solution, and/or it may be local to the mobile device.

55 Claims, 6 Drawing Sheets

(51) Int. Cl.

| | |
|---|---|
| ***G06Q 30/0241*** | (2023.01) |
| ***G06Q 30/0251*** | (2023.01) |
| ***G06Q 30/06*** | (2023.01) |
| ***G06Q 30/0601*** | (2023.01) |

(56) References Cited

U.S. PATENT DOCUMENTS

| | | | | |
|---|---|---|---|---|
| 9,207,658 | B2 * | 12/2015 | Besore | G06Q 30/0261 |
| 9,412,120 | B1 * | 8/2016 | Bitoun | H04L 63/08 |
| 10,062,071 | B2 * | 8/2018 | Sanchez | H04L 63/083 |
| 2013/0041752 | A1 * | 2/2013 | Crum | G06Q 30/06 705/14.57 |
| 2013/0046619 | A1 * | 2/2013 | Translateur | G06Q 30/02 705/14.46 |
| 2013/0132274 | A1 * | 5/2013 | Henderson | G06Q 20/4014 705/41 |
| 2013/0185150 | A1 * | 7/2013 | Crum | G06Q 30/06 705/26.8 |
| 2013/0311266 | A1 * | 11/2013 | Vichich | G06Q 20/387 705/14.27 |
| 2014/0089068 | A1 * | 3/2014 | Yehezkel | G06Q 30/0217 705/14.19 |
| 2015/0039422 | A1 * | 2/2015 | Abraham | G06Q 30/0251 705/14.49 |
| 2015/0324828 | A1 * | 11/2015 | Ouimet | G06Q 30/0225 705/14.23 |
| 2020/0273087 | A1 * | 8/2020 | Yuan | G06Q 30/0633 |

OTHER PUBLICATIONS

Shopify. Generate Traffic and Drive Sales with the Complete Guide to Google Shopping. (Jun. 14, 2016). Retrieved online Feb. 29, 2020. https://www.shopify.com/blog/google-shopping (Year: 2016).*

Martin, Taylor. How to make shopping lists with Google Home. (May 18, 2017).Retrieved online Feb. 29, 2020. https://www.cnet.com/how-to/google-home-how-to-make-your-own-shopping-list/ (Year: 2017).*

* cited by examiner

SYSTEMS AND METHODS FOR GENERATING AND/OR MODIFYING ELECTRONIC SHOPPING LISTS FROM DIGITAL ADVERTISEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue application of issued U.S. Pat. No. 10,692,129, issued Jun. 23, 2020, which claims priority to U.S. Provisional Application No. 62/548,336, filed Aug. 21, 2017, which is incorporated by reference herein in its entirety.*

FIELD OF THE TECHNOLOGY

The technology of this application relates generally to digital advertisements and more specifically but not exclusively to creating and/or modifying an electronic list by adding an item associated with a digital advertisement to the list.

BACKGROUND OF THE TECHNOLOGY

Digital advertisements are often displayed within mobile applications or on mobile websites and often link to other mobile websites or HTML pages, such that when a consumer clicks on or otherwise selects the advertisement, that consumer is taken to a website other than the one they are browsing. This can be annoying to consumers, especially if they did not select the advertisement on purpose.

Digital Consumer Packaged Goods (CPG) companies, among others, sell products through brick and mortar stores. As such, there exists a need to find innovative ways to provide effective digital ads that are accepted by consumers and that lead to in-store/brick and mortar purchases.

Additionally, with the rise of new services such as curbside pickup and grocery delivery services, consumer shopping habits have changed. Impulse purchases, which currently occur while a consumer walks through a store, do not occur when a consumer plans/executes their shopping trip from home, work or some other location other than in the store and never physically enters the store.

It may be advantageous to create systems and methods for generating advertisements with Add-To-List capabilities to facilitate adding products to a shopping list for a consumer who views or otherwise selects an advertisement.

BRIEF SUMMARY OF THE TECHNOLOGY

Many advantages will be determined and are attained by one or more embodiments of the technology, which in a broad sense provides systems and methods for generating and/or modifying a shopping list for a consumer who views or otherwise selects a digital advertisement. An item may be added to the shopping list upon the consumer selecting the advertisement, or the consumer may be provided the option to (i) add the item while viewing the advertisement, (ii) not add the item, (iii) open the list to view which items have already been added, or (iv) add the item to the list at a later time (in which case one or more reminders may be manually or automatically be configured or a trigger event may be set which causes the item to be added to the list).

In one or more implementations of the technology, a computer-implemented method is provided for generating a digital shopping list. At least a portion of the method may be performed by a computing device that includes at least one processor. The method may include presenting an electronic advertisement associated with a product, for display on a mobile device. The method also may include the mobile device receiving input indicating a selection of the advertisement, and the mobile device routing a mobile application ("app") on the mobile device to an online shopping list. The method may also include the mobile device adding an identification of the associated product to the shopping list.

In one or more implementations of the technology, a system for generating a digital shopping list from an advertisement displayed on a mobile device is provided. The system may include a mobile advertisement presentation module, stored in memory, that provides a mobile advertisement, that advertises a product, for display on a mobile device. The system may also include an advertisement selection module, stored in memory, that detects when an advertisement has been selected for viewing, and a routing module, stored in memory, that routes a browser located on the mobile device to a shopping list. The system may include a list generating module, stored in memory, that enters information about the advertised product into the shopping list, and at least one processor that executes the mobile advertisement presentation module, the advertisement selection module, the routing module, and the list generating module.

In one or more implementations of the technology, a non-transitory computer-readable medium including one or more computer-executable instructions is provided which, when executed by at least one processor of a computing device, cause the computing device to present an advertisement for a product on a display of a mobile device. The computer-executable instructions may also cause the computing device to detect a selection of the advertisement for viewing, open a remote shopping list, and enter information about the advertised product into the shopping list.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with any accompanying drawings in which.

Figure 1:
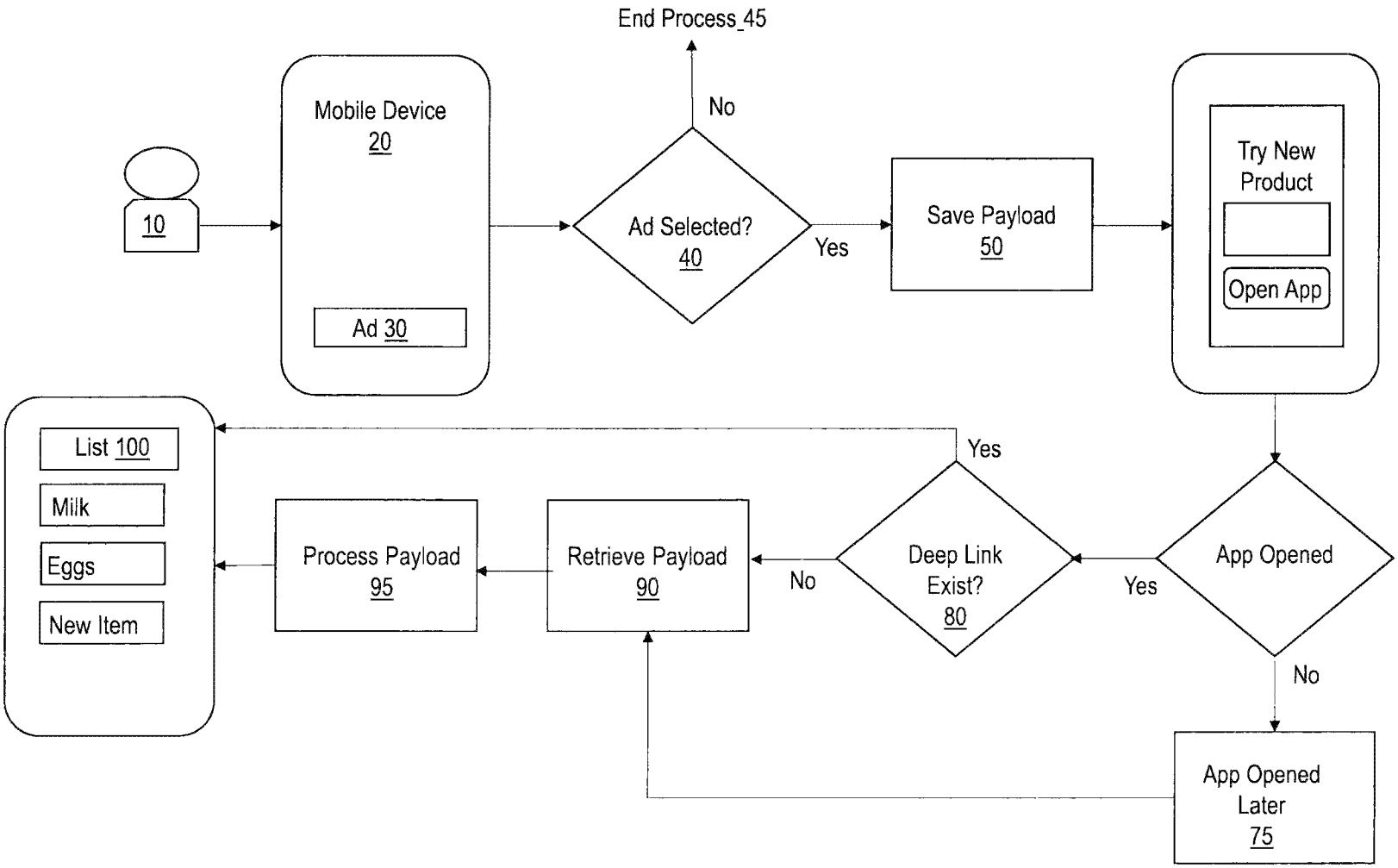
FIG. 1 illustrates a method for adding an item associated with an advertisement to a list in accordance with one or more aspects of the disclosed technology.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE TECHNOLOGY

One or more embodiments of the technology provides, in a broad sense, systems and methods for providing digital advertisements to a consumer, then generating and/or modifying a shopping list for the consumer who selects one or more of the advertisements for viewing. A targeted advertisement may be presented to the consumer. The consumer selects the advertisement in a conventional manner such as clicking on, rolling over, or any other method of selecting an advertisement. After the advertisement is selected, or when the advertisement is selected the consumer may be provided with an option to place one or more of the advertised products or services into an electronic shopping list. Alternatively, one or more products may be automatically placed into the shopping list. The shopping list may then be configured to open when the consumer enters or comes within a defined proximity of an advertised store or enters or comes within a defined proximity of a store which carries the product or service or when the consumer manually selects to open the shopping list. The shopping list may be linked with a store map which provides the location of the product/service within the store and once the product/service is purchased, the product/service may automatically be removed from the list or it may need to be manually removed from the list.

The following description is provided as an enabling teaching as it is best, currently known. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the technology described. Thus, the following description is provided as illustrative of the principles of the technology and not in limitation thereof.

Discussion of an embodiment, one or more embodiments, an aspect, one or more aspects, a feature or one or more features is intended be inclusive of both the singular and the plural depending upon which provides the broadest scope without running afoul of the existing art and any such statement is in no way intended to be otherwise limiting in nature. Technology described in relation to one of these terms is not necessarily limited to use in that embodiment, aspect or feature and may be employed with other embodiments, aspects and/or features where appropriate.

For purposes of this disclosure "mobile device" means a mobile phone, laptop computer, tablet computer, personal digital assistant ("PDA"), electronic reader ("e-reader"), mobile game console, smart watch, smart glasses, voice assistant devices, or any other mobile device which has the ability to run software applications ("apps") and transmit and receive data.

For purposes of this disclosure "remote" means accessible via network, telephone, email, text, video, website a combination of the same or any other form of communication wherein the parties need not be collocated to communicate.

For purposes of this disclosure "targeted advertisement" or "targeted advertising" means one or more digital advertisement(s) directed to a consumer based on information known, learned or estimated about a consumer and/or directed to the consumer with information that could be used to identify the consumer. The advertisement need not be targeted to fall within a scope of the technology, but it is preferably. Thus, the terms "targeted advertisement" or "targeted advertising" may include random or semi-random advertisements.

For purposes of this disclosure "item", "product", "service" are used interchangeably herein and means anything that can be sold or purchased in a brick and mortar store.

For purposes of this disclosure "app" means a software application that can be run on a mobile device. It may also include a web accessible application.

For purposes of this disclosure "Cloud", "Web", and/or "Internet" shall be used interchangeably herein and shall refer to the global wide area network referred to as the world wide web.

For purposes of this disclosure "advertising creative" means pictures, banner ads, social ads, video ads or other conventional types of digital advertisements.

In one or more embodiments, a consumer logs into an app on a mobile device. Initially, a consumer downloads the app and sets up a profile in which the consumer enters name, password and any other conventional information that is usually entered for signing up for an app. Once the consumer signs up for the app, the consumer may be presented with a login screen. The decision whether to require a login is a design choice. The consumer may sign up for the app prior to viewing a participating advertisement or may be provided the opportunity to sign up when viewing a participating advertisement.

While logged in, a mobile advertisement may be displayed on the mobile device. Through an application programming interface ("API"), one or more mobile shopping lists may integrate technology directly into the app. The app may then be used on a consumer's mobile device. When the consumer selects the advertisement, the consumer may be presented with an option to save the advertised product into a shopping list. The list could be an existing list or a new list. The advertisement may be for a single item or it may be for multiple items. For advertisements which include multiple items the consumer may be provided a choice of which items to include in the shopping list. The list may be stored online (e.g. at a deep link URL), and/or at the mobile device (either directly or it may be pushed to the mobile device). The list may only include the item, or it may also include a store that sells the item. If the shopping list is for a specific store, the list may automatically open on the mobile device when the mobile device comes within a defined proximity to the store. This may be done via geo-fencing, beacon technology or some other location-based method. Optionally, the app may include a map of the store or a map of the store may be provided to the mobile device, which may show the location of the item(s) within the store. Upon checkout, the cashier may employ a merchant side app which sends information about the items purchased to the consumer side app so that items that were purchased may be automatically removed from the shopping list. In one or more embodiments, the consumer may be provided an option as to whether the item should be removed from the list or not.

In one or more embodiments, as illustrated in FIG. 1, a consumer 10 operates a mobile device 20 and an advertisement 20 may be displayed. If the consumer 10 does not select the advertisement 45 then the process ends 45. If the consumer 10 selects the advertisement at 50, an associated payload is served 50 to the mobile device 20 and the consumer 10 may be provided the option 60 to save the product 60 listed in the advertisement 20. The consumer 10 may also be provided the option to open the app 70 (assuming the app is not already open). If the consumer does not open the app 75 the payload may be stored for a later time when the consumer 10 opens the app. If the consumer 10 opens the app at 80 it is determined if a deep link exists for the item 60. If a deep link exists, then the item 60 is added to a shopping list 100 which may be displayed on the mobile device 20. If a deep link does not exist, the app may retrieve a payload at 90, process the payload at 95 and then the item 60 may be added to a shopping list 100 which may be displayed on the mobile device 20. If the consumer 10 has already opened the app prior to viewing the advertisement, step 70, determining if the user opened the app, may be skipped.

Figure 2:
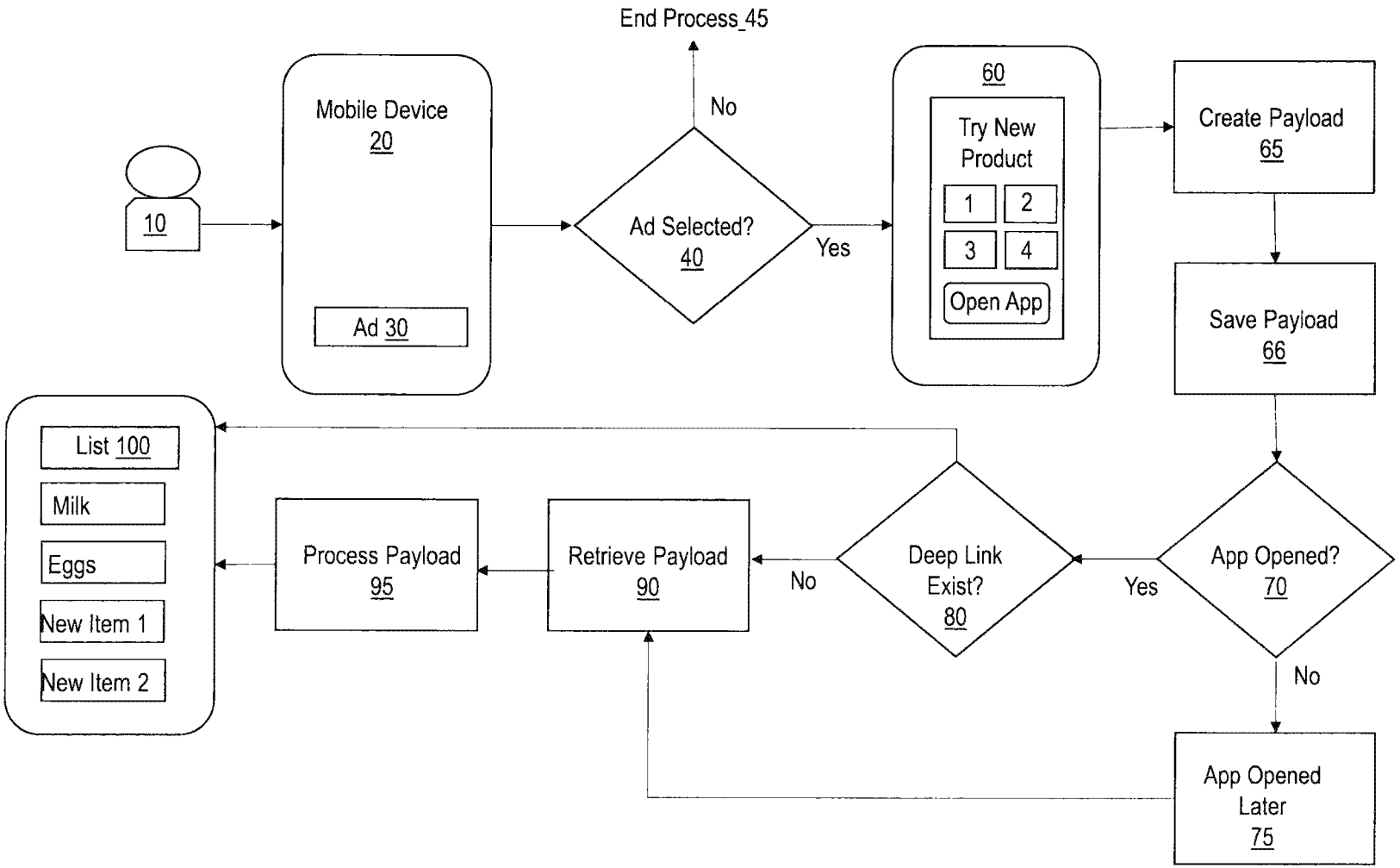
FIG. 2 illustrates the technology of FIG. 1 with multiple items associated with an advertisement.

As illustrated in FIG. 2, the advertisement 30 may include multiple items 60. The consumer 10 may be provided a choice of which items 60 to include in the shopping list 100. When the consumer selects an item 60 or multiple items 60 to include, a payload may be created 65 for the selected item(s) and saved 66. The consumer 10 may be provided the option to open the app 70. If the consumer does not open the app 75 the payload may be stored for a later time when the consumer 10 opens the app. If the consumer 10 opens the app at 80 it is determined if a deep link exists for the item 60. If a deep link exists, then the item 60 is added to a shopping list 100 which may be displayed on the mobile device 20. If a deep link does not exist, the app will retrieve a payload at 90, process the payload at 95 and then the item 60 may be added to a shopping list 100 which may be displayed on the mobile device 20. If the consumer 10 has already opened the app prior to viewing the advertisement, step 70, determining if the user opened the app may be skipped.

Figure 3:
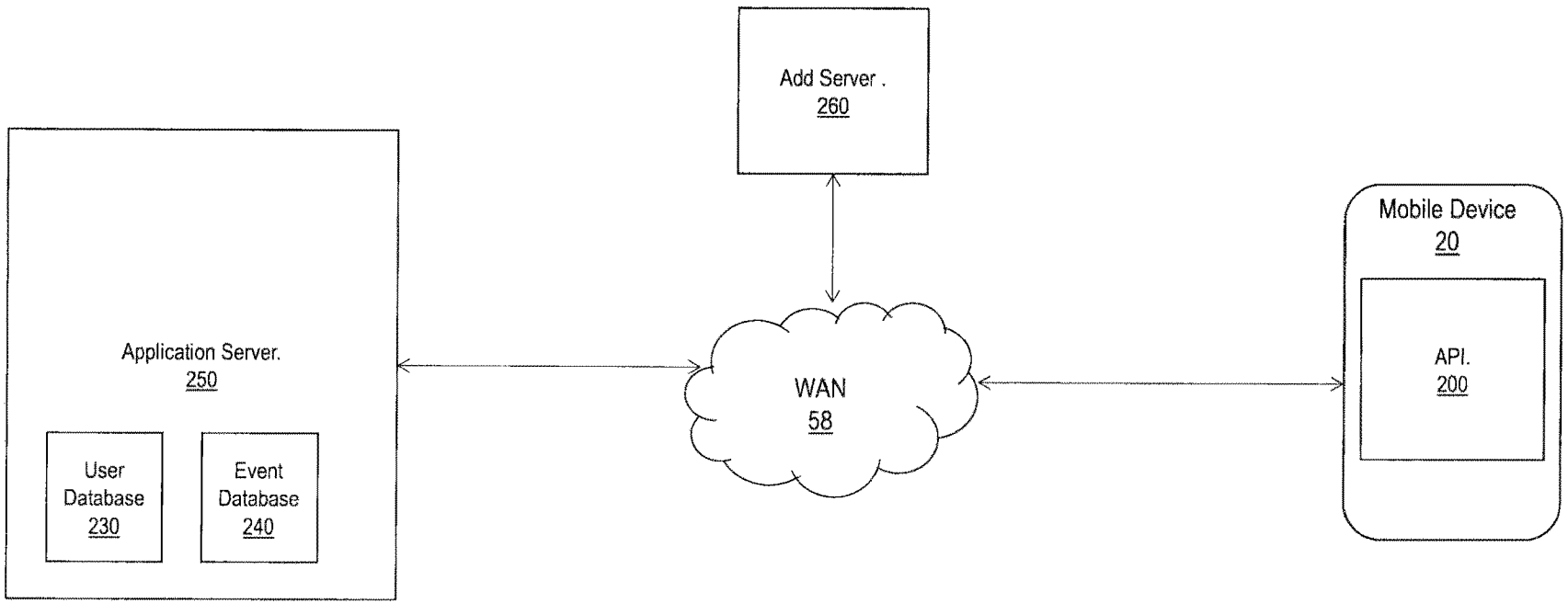
FIG. 3 illustrates a system for adding an item associated with an advertisement to a list in accordance with one or more aspects of the disclosed technology.

In one or more embodiments, as illustrated in FIG. 3, once the system is integrated and the app is running on a consumer's mobile device 10, the API 200 communicates with a remote user database 230 and event database 240. These may be separate databases or the same database. Unique identifiers may be transmitted to the user database 230 and actions taken within the app may be transmitted to the event database 240. Once a user selects an advertisement 30, a tracking payload may be saved to an online database 230 that maps tracking payloads to specific consumers. The consumer may then be routed to a landing page, which may open a deep link URL. This URL may attempt to open the consumer's mobile shopping list 100. If the consumer chooses to skip this step, they may be presented with a close button or some other option. When a consumer opens their shopping list 100, either via deep link or at a later time, the tracking payload may be retrieved from the remote database 230. The client application sends a request to the database that contains a unique consumer identifier and an application identifier. The payload may then be passed from the database to the client application. Once the payload is received by the client application, it is decoded into the product data model. The client device then places information from the data model into the shopping list 100. The shopping list may be an online list, and/or it may be pushed to the mobile device.

Figure 4:
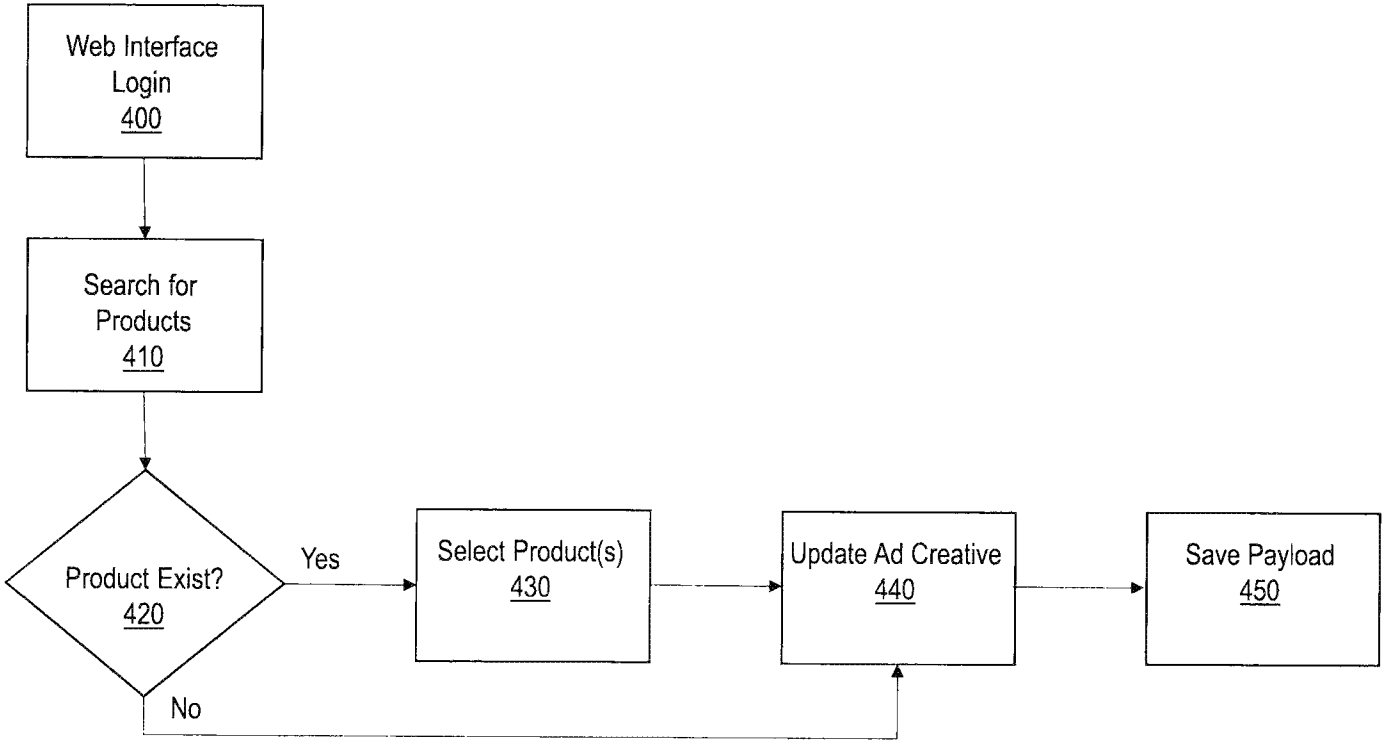
FIG. 4 provides a flow chart illustrating creation of a payload in accordance with one or more aspects of the disclosed technology.

As illustrated in FIG. 4, through the web-based system, a product payload may be created which contains 1 or more products. The payload may include a custom data object that represents a specific product, including name, images, and universal product code ("UPC") number and/or other custom identifiers, as well as internal identifiers. In addition, a payload may also contain metadata that will be used as content to be saved to a user's shopping list. Metadata may include product name, quantity, pictures of the product, and price. Additional information and/or different information may be included. Once metadata is saved, that data may be used to generate multiple payloads. Payloads may be created prior to being embedded within an advertisement. Creation of a payload may include a system administrator logging into a web-based application service 400. The system admin may search 410 for one or more items to include in the payload. If the item does not already exist, then the admin may create a new item 425. If the item exists in the system or after the admin creates the new item 425 the admin may select the item 430. The admin then may update an ad creative 440 to create a payload 440. The payload is then saved 450.

When generating payloads, a combination of products, apps, and advertising creatives may be combined. Payloads may then be preconfigured for specific execution channels, such as ad exchanges, social ad exchanges, or other mobile applications. Once a payload is combined with an execution channel, a series of unique URLs, which are not limited to standard HTTP environments, may be generated and saved to a cloud-based payload service. The unique URLs may then be used to enable any type of mobile advertisement to support Add-To-List functionality.

In one or more embodiments, once a consumer interacts with an advertisement, they may be taken to the unique link generated with a payload. At that time, a tracking identifier and a user identifier may be saved to the payload service. A tracking payload may be created which contains tracking mechanisms for the product payload, combined with a specific mobile app. This tracking payload may be converted into a deep link URL, HTML Ad Tag, with one more encoding methods. The tracking payload may be added to a mobile advertisement. The advertisement may leverage any of the above methods. Through an interface, images are uploaded and converted into ad placements for use within ad exchanges/servers. When a consumer views an advertisement they may have the option to immediately open the application with the shopping list they use or move on from the advertisement and open the list later. When a user chooses to open the application immediately, an optional deep link URL may open the application and deliver the payload content directly to the app. Once the app is open, the API installed on the client device may collect the data from the payload and place the product on the shopping list. At this point, the payload identifier for the user identifier may be removed from the payload service.

If the user chooses not to open the app, the payload may remain saved in the payload service with the user identifier collected. In one or more embodiments the API on the client device may communicate with the payload service and retrieve one or more payloads for the user identifier. The API may collect the data from the payload and place the product on the shopping list. At this point, the payload identifier for the user identifier may be removed from the payload service.

Figure 5:
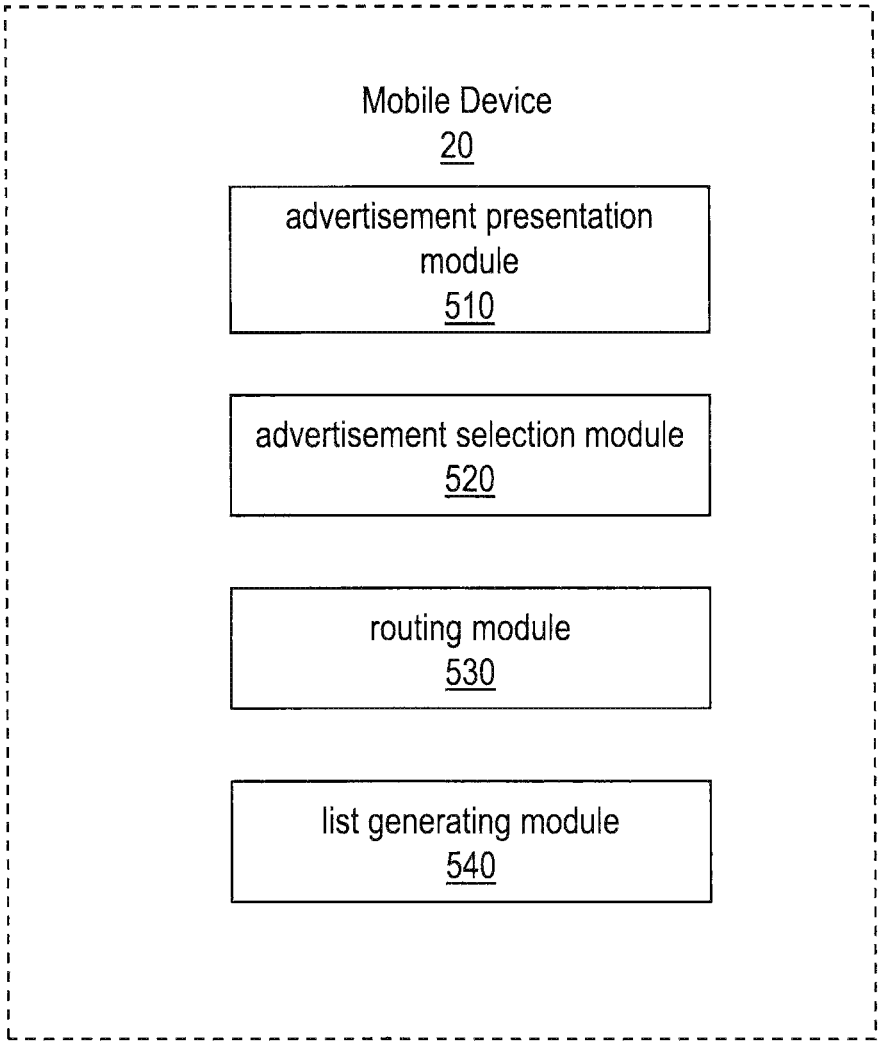
FIG. 5 illustrates a mobile device that adds an item associated with an advertisement to a list in accordance with one or more aspects of the disclosed technology; and, FIG. 6 provides a block diagram illustrating elements which may be present in a mobile device in accordance with one or more aspects of the disclosed technology.
Figure 6:
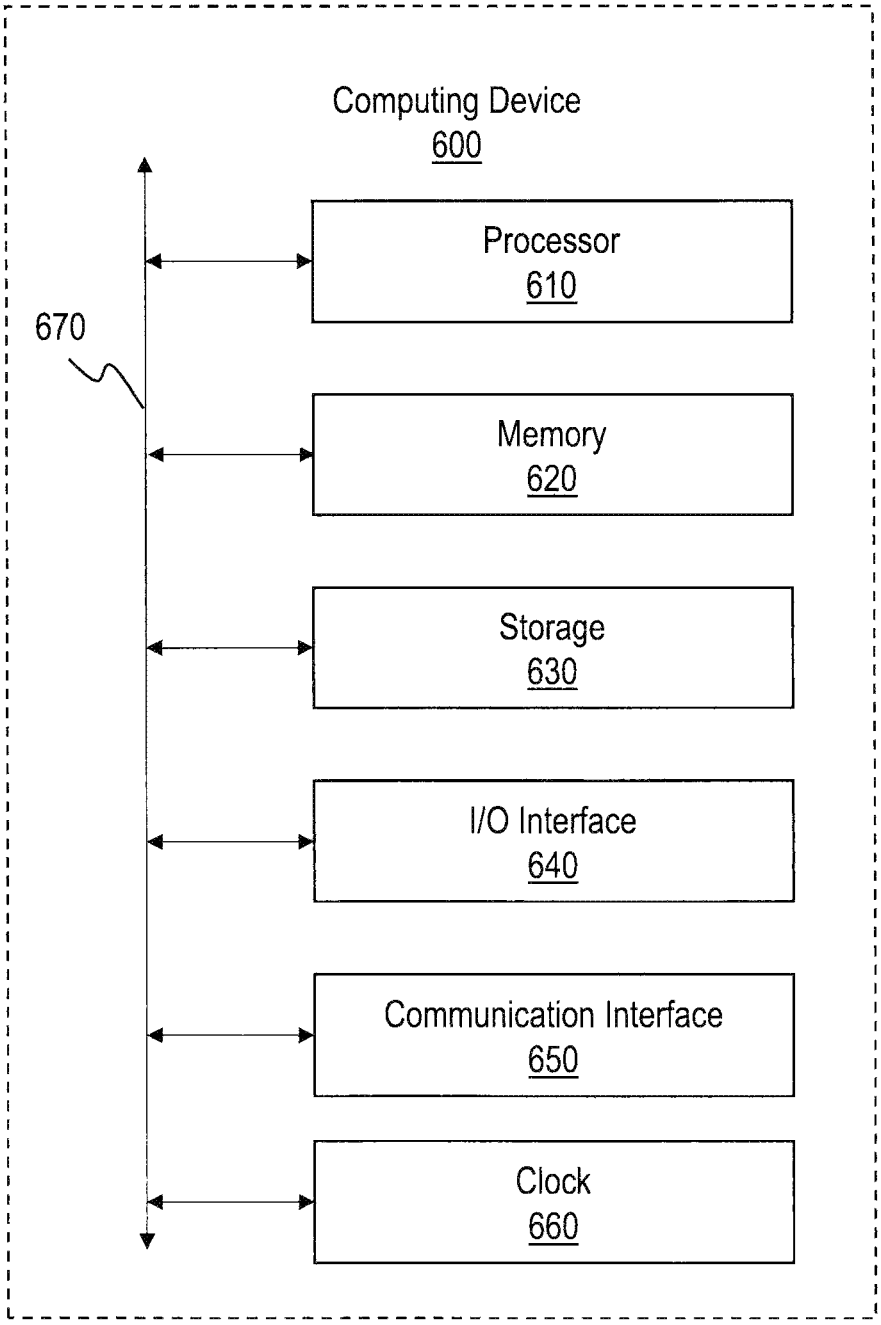

FIG. 5 is a functional block diagram of a mobile device 20 illustrating various modules which provide list generation/modification and their interactions. Aside from the various modules illustrated in FIG. 5, mobile device 20 may include one or more elements illustrated in FIG. 6 (e.g. processor 610, memory 620, storage 630, input/output interface 640, communication interface 650, clock 660 and bus 670) which may be employed to realize one or more of the various modules. As illustrated, mobile device 20 may include a mobile advertisement presentation module 510, stored in memory, that provides a mobile advertisement which is associated with a product, for display on mobile device 20. It may include an advertisement selection module 520, stored in memory, that detects when an advertisement has been selected for viewing, a routing module 530, stored in memory, that routes a browser located on the mobile device to a shopping list, a list generating module 540, stored in memory, that enters information about the advertised product into the shopping lit, and at least one processor that executes the mobile advertisement presentation module, the advertisement selection module, the routing module, and the list generating module.

Having thus described preferred embodiments of the technology, advantages can be appreciated. Variations from the described embodiments exist without departing from a scope of the invention. It is seen that systems and methods are provided for generating and/or modifying a shopping list from a selection of mobile advertisements. The advertisements may be targeted to a consumer or they may include information that associates the advertisement with the consumer or they may be random. Although specific embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the technology as defined by the claims. Other aspects, advantages, and modifications are considered to be within the scope of the following claims. The claims presented are representative of the technology disclosed herein. Other, unclaimed technology is also contemplated. The inventors reserve the right to pursue such technology in later claims.

Insofar as embodiments of the technology described above are implemented, at least in part, using a computer system, it will be appreciated that a computer program for implementing at least part of the described methods and/or the described systems is envisaged as an aspect of the technology. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the technology. For example, the carrier medium may be solid-state memory, optical or magneto-optical memory such as a readable and/or writable disk for example a compact disk (CD) or a digital versatile disk (DVD), or magnetic memory such as disk or tape, or mobile phone and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the technology as described herein, and all statements of the scope of the technology which, as a matter of language, might be said to fall there between.

Having described the technology, what is claimed as new and secured by Letters Patent is:

1. An improved computer-implemented method for generating a digital shopping list, at least a portion of the method being performed by a computing device comprising at least one processor, the method comprising:

presenting an electronic advertisement associated with a product, for display on a mobile device;

the mobile device receiving input indicating a selection of the advertisement;

in response to receiving the input, the mobile device providing an option to open a mobile application ("app") for saving the product into a shopping list;

subsequent to providing the option to open the app, the mobile device receiving a negative response;

subsequent to receiving the negative response, the mobile device receiving a request to open the app and the mobile device opening the app;

subsequent to the app being opened, the mobile device routing the app to an online shopping list; and, the mobile device adding an identification of the associated product to the shopping list.

2. The method according to claim 1 further comprising the mobile device transmitting a tracking payload to a remote database which tracks the selection of the mobile advertisement.

3. The method according to claim 1 wherein the advertisement is associated with a plurality of products.

4. The method according to claim 3 further including the mobile device receiving input indicating a selection of at least two of the plurality of associated products; and, the mobile device adding respective identifications of the at least two of the associated products to the shopping list.

5. The method according to claim 1 further including the mobile device adding an identification of a store in which the associated product may be purchased.

6. The method according to claim 5 further including the mobile device automatically opening the app in response to a detection that the mobile device is within a defined proximity to the store.

7. An improved system for generating a digital shopping list from an advertisement displayed on a mobile device, the system comprising:

a mobile advertisement presentation module, stored in memory, that provides a mobile advertisement, that advertises a product, for display on a mobile device;

an advertisement selection module, stored in memory, that detects when an advertisement has been selected for viewing and in response to detecting that an advertisement has been selected and provides an option to open a list generating mobile application ("app");

a routing module, stored in memory, that routes a browser located on the mobile device to a shopping list;

a list generating module, stored in memory, that enters information about the advertised product into the shopping list subsequent to the app being opened; and at least one processor that executes the mobile advertisement presentation module, the advertisement selection module, the routing module, and the list generating module.

8. The system according to claim 7 wherein the advertisement selection module further transmits a tracking payload to a remote database which tracks the selection of the mobile advertisement.

9. The system according to claim 7 wherein the mobile advertisement presentation module provides a mobile advertisement, that advertises a plurality of products.

10. The system according to claim 9 further including the advertisement selection module detecting that at least two of the plurality of associated products have been selected for viewing; and, the list generating module entering information about the at least two advertised products into the shopping list.

11. The system according to claim 7 wherein the list generating module further adds an identification of a store in which the associated product may be purchased to the shopping list.

12. The system according to claim 11 further including the processor automatically opening and displaying the shopping list in response to a detection that the mobile device is within a defined proximity to the store.

13. The system according to claim 7 wherein the routing module routes the mobile app on the mobile device to the online shopping list subsequent to the advertisement not being selected.

14. An improved non-transitory computer-readable medium comprising one or more computer-executable instructions that, when executed by at least one processor of a computing device, cause the computing device to:

present an advertisement for a product on a display of a mobile device;

detect a selection of the advertisement for viewing;

subsequent to the detection of the selection of the advertisement for viewing, providing an option to open a mobile application for adding the product to a shopping list;

subsequent to opening the app, open a remote shopping list; and enter information about the advertised product into the shopping list.

15. The non-transitory computer readable medium according to claim 14 further including one or more computer-executable instructions that cause the computing device to transmit a tracking payload to a remote database which tracks that the mobile advertisement was selected.

16. The non-transitory computer readable medium according to claim 14 further including one or more computer-executable instructions that cause the computing device to determine that the advertisement is associated with a plurality of products;

receive input indicating a selection of at least two of the plurality of associated products; and, add identifications of the at least two of the associated products to the shopping list.

17. The non-transitory computer readable medium according to claim 14 further including one or more computer-executable instructions that cause the computing device to add an identification of a store in which the associated product may be purchased.

18. The non-transitory computer readable medium according to claim 14 further including one or more computer-executable instructions that cause the computing device to automatically display the shopping list in response to a detection that the mobile device is within a defined proximity to the store.

19. The non-transitory computer readable medium according to claim 14 further including one or more computer-executable instructions that cause the computing device to detect that the app was not opened and send a payload and an identifier for storage in a remote database.

*20. A method for generating and/or modifying a shopping list, comprising:*

*presenting an advertisement for a product or service from one or more advertisements on a display of said mobile device;*

*said mobile device detecting a selection of an advertisement for a product or service from one or more of said advertisements for viewing on said display of said mobile device;*

*in response to the detection of the selection of the advertisement for viewing, the mobile device:*

*creating and saving a payload which tracks the selection of the mobile advertisement; and*

*providing an option to open a mobile application that uses information in the payload for adding the product or service to a shopping list; and*

*subsequent to providing the option to open the mobile application, the mobile device receiving a negative response;*

*subsequent to receiving the negative response, the mobile device receiving a request to open the app and the mobile device opening the app;*

*subsequent to opening the mobile application, the mobile device routing the mobile application a remote shopping list; and*

*the mobile device entering information about the product or service into the shopping list.*

*21. The method of claim 20, said payload further comprising:*

*a data object that represents a specific product or service, including any one or more of name, images, universal product code ("UPC") number, custom identifiers, and internal identifiers.*

*22. The method of claim 20, said payload further comprising:*

*metadata including content to be saved to a user's shopping list.*

*23. The method of claim 22, said metadata comprising:*

*any one or more of a product or service name, quantity, one or more pictures of the product, and price.*

*24. The method of claim 22, further comprising:*

*the mobile device receiving an input indicating a selection of at least two of the plurality of associated products and/or services; and*

*the mobile device adding respective identifications of the at least two of the associated products and/or services to the shopping list.*

*25. The method of claim 22, said advertisement further comprising:*

*a targeted advertisement comprising one or more digital advertisement(s) directed to a consumer based on information known, learned, or estimated about the consumer and/or directed to the consumer with information that could be used to identify the consumer.*

*26. The method of claim 20, wherein the advertisement is associated with a plurality of products and/or services.*

27. A system for generating a digital shopping list from an advertisement displayed on a mobile device, comprising:

an advertisement presentation module, stored in memory, that provides an advertisement advertising a product or service for display on the mobile device;

an advertisement selection module, stored in memory, that detects when an advertisement has been selected for viewing and in response to detecting that an advertisement has been selected:

transmits a tracking payload to a remote database which tracks the selection of the mobile advertisement; and provides an option to open a list generating application;

a routing module, stored in memory, that routes a browser located on the mobile device to a shopping list;

a list generating module, stored in memory, that enters information about the advertised product or service into the shopping list subsequent to the list generating application being opened; and at least one processor that executes the advertisement presentation module, the advertisement selection module, the routing module, and the list generating module.

28. The system of claim 27, said payload further comprising:

a data object that represents a specific product or service, including any one or more of name, images, universal product code ("UPC") number, custom identifiers, and internal identifiers.

29. The system of claim 27, said payload further comprising:

metadata including content to be saved to a user's shopping list.

30. The system of claim 27, said metadata comprising:

any one or more of product or service name, quantity, pictures of the product, and price.

31. The system of claim 27, wherein the advertisement presentation module provides an advertisement that advertises a plurality of products and/or services.

32. The system of claim 27, further including the advertisement selection module detecting that at least two of the plurality of associated products and/or services have been selected for viewing; and the list generating module entering information about the at least two advertised products and/or services into the shopping list.

33. A non-transitory computer-readable medium comprising one or more computer-executable instructions that, when executed by at least one processor of a computing device, cause the computing device to:

present an advertisement for a product or service on a display of a mobile device;

detect a selection of the advertisement for viewing;

subsequent to the detection of the selection of the advertisement for viewing:

transmitting a tracking payload to a remote database which tracks the selection of the mobile advertisement; and providing an option to open an application for adding the product or service to a shopping list;

subsequent to opening the application, open a remote shopping list; and enter information about the advertised product or service into the shopping list.

34. The non-transitory computer-readable medium of claim 33, said payload further comprising:

metadata including content to be saved to a user's shopping list.

35. The non-transitory computer-readable medium of claim 33, said metadata comprising:

any one or more of product or service name, quantity, pictures of the product, and price.

36. The non-transitory computer-readable medium of claim 33, wherein the advertisement presentation module provides an advertisement that advertises a plurality of products and/or services.

37. The non-transitory computer readable medium of claim 33, further comprising:

one or more computer-executable instructions that cause the computing device to determine that the advertisement is associated with a plurality of products and/or services;

receive input indicating a selection of at least two of the plurality of associated products and/or services; and, add identifications of the at least two of the associated products and/or services to the shopping list.

38. The non-transitory computer readable medium of claim 33, further comprising;

one or more computer-executable instructions that cause the computing device to detect that the app was not opened and send the payload and an identifier for storage in a remote database.

39. The non-transitory computer medium of claim 33, said advertisement further comprising:

a targeted advertisement comprising one or more digital advertisement(s) directed to a consumer based on information known, learned, or estimated about the consumer and/or directed to the consumer with information that could be used to identify the consumer.

40. A method for generating and/or modifying a shopping list, comprising:

presenting an electronic advertisement associated with a product, for display on a mobile device;

the mobile device receiving input indicating a selection of the advertisement;

in response to receiving the input, the mobile device:

creating and saving a payload which tracks the selection of the mobile advertisement; and providing an option to open a mobile application ("app") that uses information in the payload to add the selected product to a shopping list;

subsequent to providing the option to open the app, the mobile device receiving a negative response;

subsequent to receiving the negative response:

the mobile device storing the payload; and the mobile app receiving a request to open the app and the mobile device opening the app;

subsequent to the app being opened, the mobile device routing the app to an online shopping list and determining if a deep link exists for the product or service;

when a deep link exists, adding the product or service to a shopping list for display on the mobile device;

when a deep link does not exist, the application:

retrieving the payload;

processing the payload; and adding the product or service to a shopping list for display on the mobile device.

41. The method of claim 40, further comprising:

a merchant application sending information about products and/or services purchased to the consumer application, wherein purchased products and/or services are automatically removed from the shopping list.

*42. The method of claim 40, said payload further comprising:*

*a data object that represents a specific product or service, including any one or more of name, images, universal product code ("UPC") number, custom identifiers, and internal identifiers.*

*43. The method of claim 40, said payload further comprising:*

*metadata including content to be saved to a user's shopping list.*

*44. The method of claim 40, said metadata comprising:*

*any one or more of product or service name, quantity, pictures of the product, and price.*

*45. The method of claim 40, said advertisement further comprising:*

*a targeted advertisement comprising one or more digital advertisement(s) directed to a consumer based on information known, learned, or estimated about the consumer and/or directed to the consumer with information that could be used to identify the consumer.*

*46. A method for generating and/or modifying a shopping list, comprising:*

*a mobile device displaying an advertisement listing a product or service to a consumer;*

*saving a payload to a database that maps payloads to specific consumers when a consumer selects an advertisement;*

*an advertisement selection module, stored in memory, detecting when an advertisement has been selected for viewing and in response to detecting that an advertisement has been selected providing an option to open a list generating mobile application ("app");*

*subsequent to providing the option to open the app, the mobile device receiving a negative response;*

*subsequent to receiving the negative response, the mobile device receiving a request to open the app and the mobile device opening the app;*

*a list generating module, stored in memory, entering information about the advertised product into the shopping list subsequent to the app being opened;*

*a consumer application at the mobile device retrieving the payload from the database when shopping list of the consumer is opened by sending a request that contains a unique consumer identifier and an application identifier to the database;*

*passing the payload from the database to the consumer application;*

*decoding the payload into a product data model when the payload is received by the consumer application; and*

*the mobile device placing information from the data model into the shopping list.*

*47. The method of claim 46, further comprising:*

*when a consumer selects an advertisement, routing the consumer to a landing page which opens a deep link URL to open the shopping list.*

*48. The method of claim 46, further comprising:*

*a merchant application sending information about products and/or services purchased to the consumer application, wherein purchased products and/or services are automatically removed from the shopping list.*

*49. The method of claim 46, said payload further comprising:*

*a data object that represents a specific product or service, including any one or more of name, images, universal product code ("UPC") number, custom identifiers, and internal identifiers.*

*50. The method of claim 46, said payload further comprising:*

*metadata including content to be saved to a user's shopping list.*

*51. The method of claim 46, said metadata comprising:*

*any one or more of product or service name, quantity, pictures of the product, and price.*

*52. The method of claim 46, said advertisement further comprising:*

*a targeted advertisement comprising one or more digital advertisement(s) directed to a consumer based on information known, learned, or estimated about the consumer and/or directed to the consumer with information that could be used to identify the consumer.*

*53. A method for generating and/or modifying a shopping list, comprising:*

*receiving an input indicating a selection of an advertisement for a product or service from one or more advertisements available for display on a mobile device;*

*in response to receiving the input, the mobile device providing an option to open a mobile application ("app") for saving the product into a shopping list;*

*in response to receiving the input, creating and saving a payload comprising metadata including content to be saved to a user's shopping list, wherein said payload tracks the selection of the advertisement;*

*subsequent to providing the option to open the app, the mobile device receiving a negative response;*

*subsequent to receiving the negative response, the mobile device receiving a request to open the app and the mobile device opening the app;*

*subsequent to opening the app, opening a remote shopping list; and*

*entering information about the advertised product into the shopping list.*

*54. The method of claim 53, said payload further comprising:*

*a data object that represents a specific product or service, including any one or more of name, images, universal product code ("UPC") number, custom identifiers, and internal identifiers.*

*55. The method of claim 54, said metadata comprising:*

*any one or more of a product or service name, quantity, one or more pictures of the product, and price.*

* * * * *